Nov. 15, 1927.
N. H. CLOUGH
1,649,510
WIRELESS INSTALLATION ON VEHICLES SUCH AS AUTOMOBILES
Filed Oct. 23, 1923
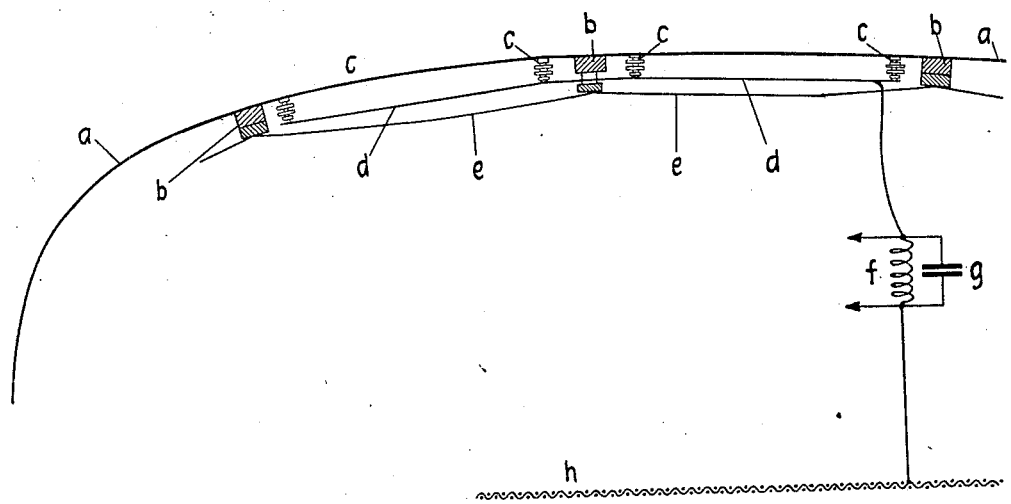
INVENTOR
N. H. CLOUGH
BY
ATTORNEY Patented Nov. 15, 1927.

1,649,510

UNITED STATES PATENT OFFICE.

NEWSOME HENRY CLOUGH, OF LONDON, ENGLAND, ASSIGNOR TO RADIO CORPORATION OF AMERICA, A CORPORATION OF DELAWARE.

WIRELESS INSTALLATION ON VEHICLES SUCH AS AUTOMOBILES.

Application filed October 23, 1923, Serial No. 670,234, and in Great Britain November 13, 1922.

The object of this invention is to provide an improved wireless installation on an automobile or other vehicle.

According to this invention in place of a frame aerial or an aerial consisting of a vertical wire, I provide an elevated capacity supported by the roof or hood of the vehicle and connected to the chassis or under-carriage or to a capacity specially provided near the ground. The elevated aerial may be supported on insulators above the roof or slung by insulators beneath the roof or may be built into or actually form the roof, care being taken to insulate it from the body of the vehicle. This elevated capacity is preferably connected to the under-carriage or chassis or to a special capacity formed, for instance, of a copper gauze mat in the floor of the vehicle which may be connected to the chassis, by an inductance shunted by a small variable condenser or other equivalent arrangement by which the circuit can be tuned, the voltages induced across the inductance being applied in the usual manner to the grid and filament of an amplifier valve.

The invention is illustrated by the accompanying drawing which is a diagrammatic longitudinal section through part of the hood of a car.

$a$ is the skin of the hood supported by cross battens. $b$, $c$ are insulators from which is suspended a copper sheet $d$. $e$ is upholstery which conceals the sheet $d$ from view. The sheet $d$ is connected through an inductance $f$ shunted by a condenser $g$ to the chassis or to a copper gauze mat $h$ in the floor of the vehicle.

Such an installation has the advantage that it is unobtrusive allowing the vehicle to be equipped for reception in motion without its appearance being spoilt, that it possesses great mechanical strength, that it is free from directional effect and that only a small capacity is needed in parallel with the inductance.

Having described my invention, what I claim is:

In a vehicle, an overhead antenna, a plurality of insulators mounted in the roof of said vehicle, said insulators being adapted to support said antenna, a plurality of insulating cross battens mounted in said roof, said battens being provided with transverse openings through which said antenna is passed, an upholstery covering adapted to conceal said antenna from view, said upholstery being supported by said battens, and a connection between said antenna and the chassis of said vehicle.

NEWSOME HENRY CLOUGH.